United States Patent [19]

Pihlaja et al.

[11] 4,016,670
[45] Apr. 12, 1977

[54] ICE FISHING DEVICE

[76] Inventors: Eino Pihlaja, 101 Machar Ave.; Risto Hirvasoja, 20 Peter St., both of Thunder Bay P, Ontario, Canada

[22] Filed: July 29, 1976

[21] Appl. No.: 709,794

[52] U.S. Cl. ................................................. 43/17
[51] Int. Cl.² ...................................... A01K 97/12
[58] Field of Search ................. 43/15, 16, 17, 21.2

[56] References Cited

UNITED STATES PATENTS

| | | | |
|---|---|---|---|
| 1,808,736 | 6/1931 | Hernke | 43/17 |
| 2,008,555 | 7/1935 | Kovane | 43/16 |
| 2,752,716 | 7/1956 | Porter | 43/16 |
| 3,147,563 | 9/1964 | Molter | 43/17 |

*Primary Examiner*—Warner H. Camp
*Attorney, Agent, or Firm*—Donnelly, Maky, Renner & Otto

[57] ABSTRACT

An ice fishing device has a rod and reel member pivotally connected between its ends to the upper end of a mast member which has its lower end portion firmly anchored in an ice mound (initially firmly packed wet snow or slush) adjacent to the hole in the ice, the rod and reel member being retained in normal fishing position by locating the pivotal connection forwardly of the center of gravity of the rod and reel member whereby a downward pull on the tip of the rod portion by a striking or hooked fish will swing the rod and reel member against the gravity force moment to signal the fisherman to reel the fish in. The pivotal connection between the rod and reel member and the mast member enables folding of the device to compact lateral and longitudinal size.

4 Claims, 5 Drawing Figures

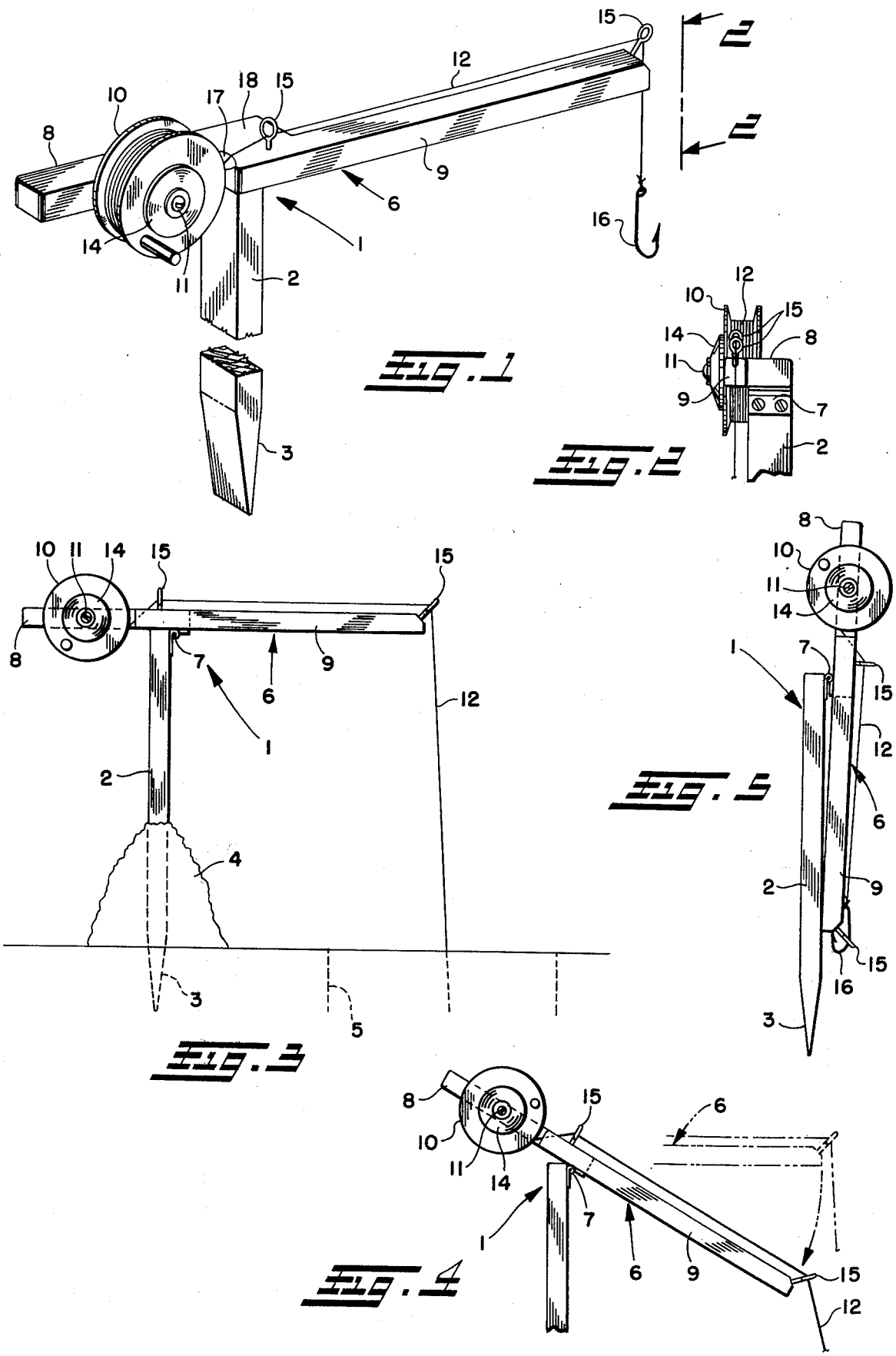

ICE FISHING DEVICE

BACKGROUND OF THE INVENTION

For ice fishing purposes, fishermen generally use their relatively expensive rods and reels in normal hand-held or propped-up manner so that the rod is flexed when a fish strikes the baited fishhook.

SUMMARY OF THE INVENTION

The present invention relates to an ice fishing device which is of simple and inexpensive construction and which may be folded to compact size for grasping in one hand for carrying to and from a fishing location and which may be quickly and easily unfolded and firmly set in fishing position adjacent to the hole in the ice.

It is a principal object of this invention to provide an ice fishing device on the character indicated in which a pivotally mounted rod and reel member is held by a center of gravity moment in a normal fishing position so that when a fish strikes or is hooked, the resulting downward pull on the fish line acting through the tip of the rod portion of said member overcomes the center of gravity moment to signal the fisherman to reel the fish in.

Other objects and advantages will appear from the ensuing description.

BRIEF DESCRIPTION OF THE DRAWING

FIG. 1 is a perspective view of an ice fishing device herein showing it in its normal gravity-held unfolded fishing position;

FIG. 2 is an end elevation view as viewed from the righthand end of FIG. 1 in the direction of arrows 2—2;

FIG. 3 is a side elevation view showing the ice fishing device in fishing position with the lower end portion of the mast member firmly anchored in an ice mound (initially firmly packed wet snow or slush) and with the tip of the rod portion of the rod and reel member disposed in spaced relation above the ice fishing hole;

FIG. 4 illustrates the position of the rod and reel member when a fish is hooked; and FIG. 5 is a side elevation view of the ice fishing device as folded to compact portable condition.

DETAILED DESCRIPTION OF A PREFERRED EMBODIMENT

Referring now in detail to the drawing, the ice fishing device 1 comprises a mast member 2 having a pointed lower end portion 3 which is adapted as shown in FIG. 3 to be firmly anchored in an ice mound 4 (initially firmly packed wet snow or slush) adjacent to the ice fishing hole 5. If desired, the pointed lower end portion 3 may be partially pounded into the ice beneath the mound 4.

A rod and reel member 6 is pivotally connected between its ends to the upper end of the mast member by means of the hinge 7, said member 6 having laterally offset handle and rod portions 8 and 9 extending in opposite directions from the hinge 7. A reel 10 is rotatably supported on the handle portion 8 by the screw 11 and the frictional drag of the reel 10 on the fish line 12 may be varied by tightening or loosening the screw 11, the head of the screw 11 bearing on a conical spring washer 14 to vary the friction force between the reel 10 and handle 8.

The rod portion 9 of the member 6 is provided with line guides 15 adjacent to the reel 10 and at the tip as shown for guiding the fish line 12 which has a fishhook 16 at its end. The end of the rod portion 9 adjacent to the reel is formed with a concavely curved recessed portion 17 further to guide the fish line 12.

The center of gravity of the rod and reel member 6 with bait on the hook 16 is to the left of the mast member 2 as viewed in FIGS. 1, 3, and 4 to maintain said rod and reel member 6 in normal fishing position when the baited fishhook 16 and line 12 are lowered into the water through the hole 5. The frictional drag of the reel 10 is adjusted so that a normal downward pull on the downwardly extending portion of the fish line 12 by a striking or hooked fish produces a clockwise moment exceeding the counterclockwise moment at the center of gravity of the member 6 which will cause rod and reel member 6 to be swung clockwise about the hinge 6 to the FIG. 4 position thus to signal the fisherman to reel the fish in by grasping the handle 8 and turning the reel 10 in clockwise direction. As evident, the frictional drag of the reel 10 must be such as to permit the application of sufficient force at the tip of the rod portion 9 to cause swinging of the member 6 about the hinge 6 pivot.

When the member is in the FIG. 4 position, the fisherman may apply a sudden downward force on the handle 8 for setting the hook 16.

When installing the device 1, the mast 2 may be driven into the unfrozen mound 4 as by pounding on the surface 18 of the rod and reel member 6 above the upper end of the mast 2.

When the fisherman has finished fishing, it is a simple matter to pull the mast member 2 out of the ice mound 4 as by first wiggling the mast member 2 about the narrow sides of the rectangular mast member 2. After removal of the mast member 2 as aforesaid, the rod and reel member 6 may be swung to the FIG. 5 position with the rod portion 9 overlapping and generally parallel to the mast member 2 and the point of the hook 16 may be embedded into the end of the rod portion 9 whereupon the device 1 may be grasped in one hand. If desired, a rubberband or the like may be disposed around the overlapping portions of the mast member 2 and rod portion 9 to hold them together.

By way of example, the mast member 2, the reel and rod member 6 including the reel 10, may be easily and inexpensively made of hardwood, plastic, or lightweight metal. For economy of manufacture, the reel 10 may simply comprise a flanged spool which is supported for rotation on the shank of the screw 11. Of course, the present invention may be adapted for use with more elaborate reel constructions including variable drag and level wind features but for ice fishing purposes it has been found entirely adequate to employ the simple and inexpensive device 1 as herein shown.

The embodiments of the invention in which an exclusive property or privilege is claimed are defined as follows:

1. An ice fishing device comprising a generally vertical mast member adapted to have its lower end portion anchored in a mound of packed wet snow or ice adjacent to an ice fishing hole; a rod and reel member having an elongated rod portion with a line guide at its end and having a handle portion on which a reel is rotatably supported for drawing in or letting out a fish line wound around said reel through said line guide and longitudinally along said rod portion; and hinge means pivotally connecting the upper end of said mast member to said rod and reel member in spaced relation to the center of gravity of the latter so that the latter assumes, by gravity, a normal fishing position whereat said line guide is spaced above the ice fishing hole and so that a downward pull on the fish line extending downwardly from said line guide by a fish striking or hooked by a baited fishhook at the lower end of said fish line will swing the rod and reel member about said hinge means to signal the fisherman to reel the fish in; said handle portion being laterally offset from said rod portion; and said reel being supported on said handle portion in alignment with said rod portion.

2. An ice fishing device comprising a generally vertical mast member adapted to have its lower end portion anchored in a mound of packed wet snow or ice adjacent to an ice fishing hole; a rod and reel member having an elongated rod portion with a line guide at its end and having a handle portion on which a reel is rotatably supported for drawing in or letting out a fish line wound around said reel through said line guide and longitudinally along said rod portion; and hinge means pivotally connecting the upper end of said mast member to said rod and reel member in spaced relation to the center of gravity of the latter so that the latter assumes, by gravity, a normal fishing position whereat said line guide is spaced above the ice fishing hole and so that a downward pull on the fish line extending downwardly from said line guide by a fish striking or hooked by a baited fishhook at the lower end of said fish line will swing the rod and reel member about said hinge means to signal the fisherman to reel the fish in; said mast member having a squared upper end which engages the bottom of said rod and reel member so that said rod and reel member has a horizontal normal fishing position when the mast member is vertical; said handle and rod portions being laterally offset with respect to each other whereby, when said mast member and rod and reel member are in respective vertical and horizontal positions, said mast member may be driven into such mound as by pounding on the top of the rod and reel member directly above the squared end of the mast member.

3. The device of claim 1 wherein said rod portion has another line guide adjacent said reel.

4. The device of claim 1 wherein the axis of said reel is transverse to said handle portion and aligned with said rod portion; and wherein the end of said rod portion which is adjacent to the periphery of said reel has a concavely curved beveled surface to assist in guiding the fish line as it is wound around said reel.

* * * * *